J. G. FRIBERG.
TIRE CHAIN.
APPLICATION FILED DEC. 1, 1916.
1,279,317.  Patented Sept. 17, 1918.
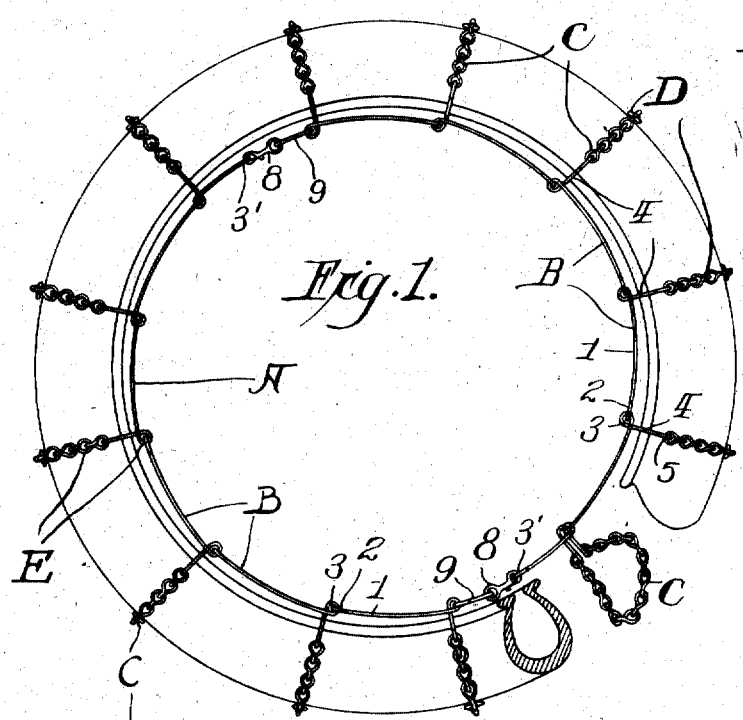
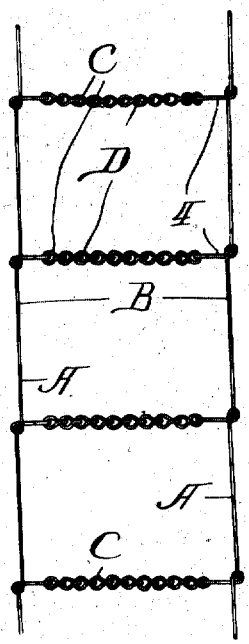
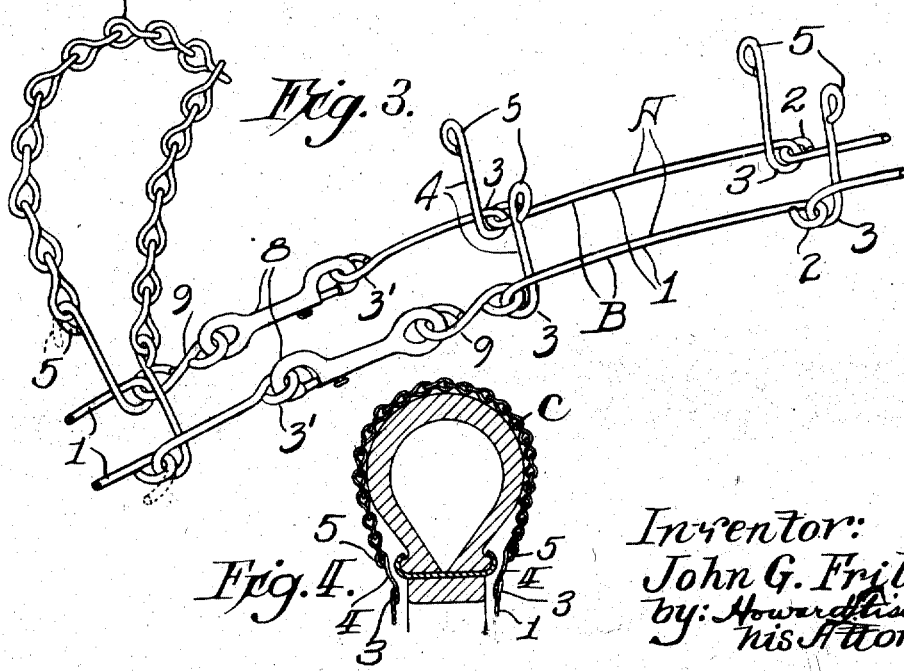
Inventor:
John G. Friberg.
by: Howard Fischer,
his Attorney.

UNITED STATES PATENT OFFICE.

JOHN G. FRIBERG, OF MAIDEN ROCK, WISCONSIN.

TIRE-CHAIN.

1,279,317.   Specification of Letters Patent.   Patented Sept. 17, 1918.

Application filed December 1, 1916. Serial No. 134,468.

*To all whom it may concern:*

Be it known that I, JOHN G. FRIBERG, a citizen of the United States, residing at Maiden Rock, in the county of Pierce and State of Wisconsin, have invented a new and useful Improvement in Tire-Chains, of which the following is a specification.

This invention relates to tire chains for preventing the slipping or skidding of wheels of an automobile or motor vehicles and is particularly adapted to gripping devices which use chains across the tread of the tire.

The object of the invention is to provide a simple and effective means for holding the cross chains in place, spaced apart.

A further object is to hold the cross chains by means which affords easy replacement of new cross chain when the old one is worn out or broken.

It is also an object to have the cross chain holding means formed in two parts which are held together by snaps or other suitable means, the object being to apply one half of the chain to the wheel or tire at a time, snapping the ends of the same around the spokes of the wheel, then turning the wheel into a position so as to apply the other half of the chain.

With these objects in view, and also others which will be hereinafter more clearly defined and set forth in the claims, in the accompanying drawings forming a part of this specification:

Figure 1 is a side elevation of a pneumatic tire part of which is broken away illustrating the improved tire chain attached thereto.

Fig. 2 is a detail view of a portion of the chain.

Fig. 3 is a perspective view of a detail portion of the chain.

Fig. 4 is a cross section of the tire illustrating the chain attached thereto.

In the drawing, A represents a holding ring which is composed of a series of links B which are freely connected together. Two rings A are used to make up the tire chain, one being placed on one side of the wheel or tire and the other on the other side. The rings A are adapted to hold the cross chains C.

The links B are formed of wire or any suitable material and have a slightly curved portion or long arm 1 which is formed with an eye 2 on one end, loop 3 on the other end and a short arm 4 extending at right angles to the portion 1 from the loop 3, the arms 4 having hooks or eyes 5 formed on their ends. It is an important feature that the links B which are formed with eyes 2, loops 3, arms 4 and hooks or eyes 5 are formed from one piece of wire or other suitable material.

The hooks 5 are adapted to hold the cross chains C in spaced apart position as illustrated in Figs. 1 and 2 and can be bent open as is illustrated in the dotted outline in Fig. 3. Thus should it be necessary to put in a new cross or gripping chain C, it can be easily and quickly accomplished by opening the hooks 5, inserting the ends of the chain in the hooks and again closing the same.

The eyes 2 are adapted to freely engage in the loops 3 of the adjacent link; thus forming a complete flexible ring A on either side of the tire. The portion 1 of links B being stiff and extending from one cross chain holding arm to the other, serve to hold the cross chains in position much better than if the links B were formed of flexible chain made up of a series of small links such as the cross chain. The arms 4 extend outward from the ring A far enough to clear the rim of the wheel and are slightly curved, thereby preventing the friction of the cross chains against the rim of the wheel, as is illustrated in Fig. 4.

The chain is made in two semi-circular parts, D and E which are connected together by means of snap hooks 8 or any other suitable means. The portions D or E of the chain can be attached independently of each other to the tire and wheel. This is a great advantage if one finds it necessary to attach the chains while the tires are in the mud, as it allows one half of the chain to be attached to the wheel and then by turning the wheel half way around, the other half can be applied to the wheel and at the same time pulling the vehicle out of the mud.

The forming of the links B in one piece simplifies the construction of the tire chain and allows the replacement of any link very easily.

While one form and construction of device has been described and shown, I desire to have it understood that this is only illustrative and the invention can be carried out by other means and applied to other uses within the scope of the following claims:

1. In a tire chain, comprising, a series of links formed from a single piece of wire, each of said links being formed with an eye one one end, a loop on the other end, an arm extending outwardly approximately at right angles from said loop and a hook formed on the outer end of said arm, the eye of each link being connected to the loop of the adjacent link to form a continuous ring on either side of a tire and cross chains adapted to be connected to said hooks, substantially as described.

2. In a tire chain comprising, a series of links formed from a single piece of material, said links being bent to form a loop, a long and a short arm extending from said loop and approximately at right angles to each other and an eye formed on the end of each of said arms whereby the eyes formed on the ends of said long arms are adapted to connect in the loops of the adjacent links to form a holding ring on either side of a tire and the eyes on said short arms are adapted to engage the ends of the cross chains which extend over the tread of said tire to form gripping means therefor.

3. In a tire chain comprising, a series of links formed from a single piece of material, said links being formed with a loop and a long and a short arm extending from said loop, eyes formed on the ends of said arms, the eye on said long arm being adapted to connect with the loop of the adjacent link to form a ring on either side of a tire and the short arm which extends at approximately right angles outwardly, from said ring being curved so as to be spaced away from the rim of a tire and the eye on said short arm connecting with cross chains which form gripping means over the tread of said tire.

JOHN G. FRIBERG.